Sept. 8, 1964    E. C. SLOAN    3,147,784
APPARATUS FOR DEAERATING AND FEEDING GROUND
MEAT MIXTURE FROM A VACUUM CHAMBER
Filed March 14, 1961
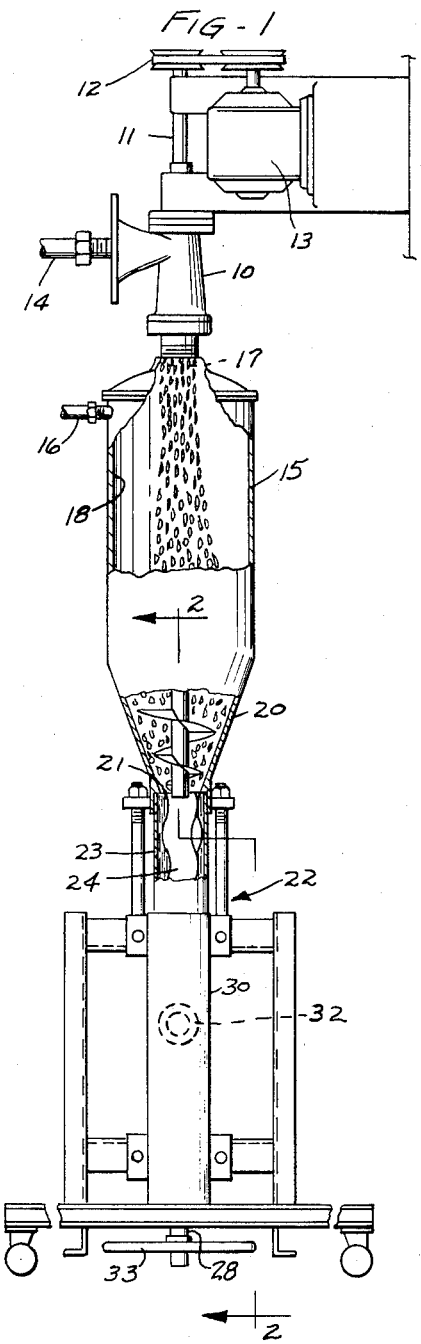
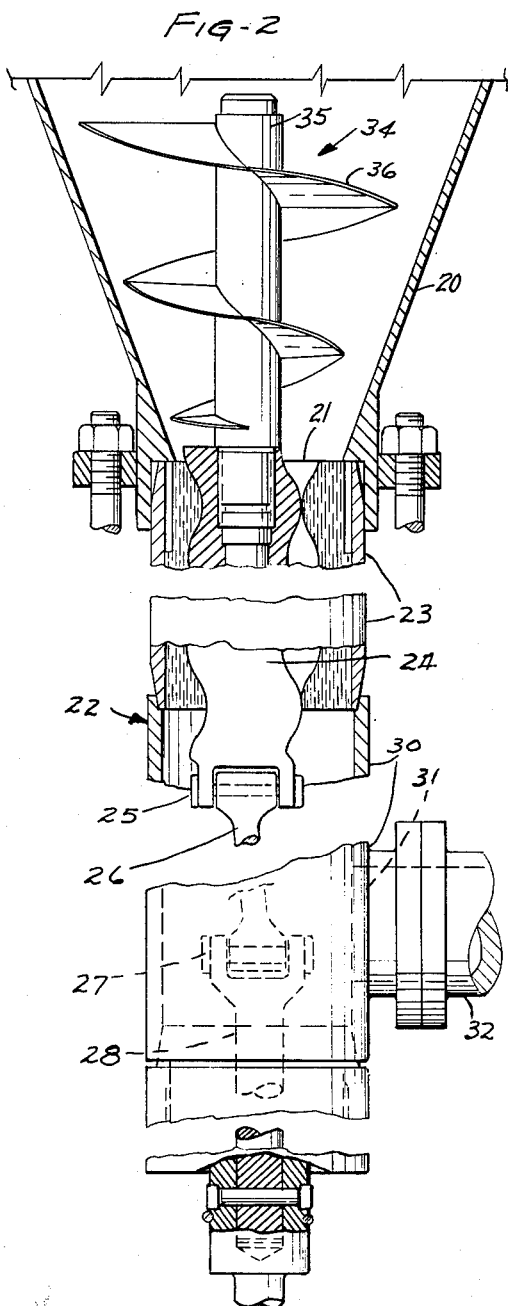
INVENTOR
EDWARD C. SLOAN
BY Cromwell Greist & Warden
ATTORNEYS United States Patent Office 3,147,784
Patented Sept. 8, 1964

3,147,784
APPARATUS FOR DEAERATING AND FEEDING GROUND MEAT MIXTURE FROM A VACUUM CHAMBER
Edward C. Sloan, Madison, Wis., assignor to Oscar Mayer & Co., Inc., Chicago, Ill., a corporation of Illinois
Filed Mar. 14, 1961, Ser. No. 95,703
3 Claims. (Cl. 146—192)

This invention relates to the handling of meat and is more particularly concerned with improvements in an apparatus and method for deaerating and feeding a ground meat mixture.

In the processing of various meat products, for example sausage, it is desirable to provide, for stuffing into the casing in which the sausage is smoked or cooked, a meat mixture which is relatively free of air or oxygen and which is of uniform density. Generally, sausage batter has been prepared, heretofore, in batches, by grinding a quantity of sausage ingredients, feeding the ground mixture into a closed chamber in which it is agitated and the air is evacuated, withdrawing the mixture from the vacuum chamber when it is deaerated, and delivering the same to the stuffing apparatus. This batch operation has not been entirely satisfactory, one reason being that an efficient method or apparatus for taking the meat mixture out of the vacuum chamber without introducing any air into the mixture has not been available. It is an object, therefore, of the present invention to provide a method and apparatus for handling a sausage meat mixture or other product of a similar nature so as to withdraw from the mixture any gases which are present therein and for advancing the mixture in a gas-free condition to a stuffing apparatus or other processing equipment.

It is a more specific object of the invention to provide a method and apparatus for handling a product such as a meat mixture which is used for making sausage wherein the meat is continuously ground to the desired fineness and delivered to the upper end of a vacuum chamber in which the mixture is deaerated and from the bottom of which the mixture is delivered in air-free condition by a pump of the type which operates on the progressing cavity principle and which forms a seal for the chamber while removing the deaerated mixture continuously with a uniform flow.

It is a more specific object of the invention to provide an apparatus for handling a ground meat mixture or similar product which comprises a vacuum chamber having an upper end sealed by a meat grinder through which the meat is delivered to the chamber and having a discharge opening in the lower end connecting with a pump which is constructed to form a seal for the vacuum chamber and to deliver the ground meat mixture from the same in a gas-free condition, the pump having associated mechanism for continuously forcing the mixture through the discharge opening in the chamber and into the pump.

These and other objects and advantages of the invention will be apparent from a consideration of the method and apparatus which is shown by way of illustration in the accompanying drawings wherein:

FIGURE 1 is a side elevation with portions broken away of an apparatuse for deaerating and feeding a ground meat mixture in accordance with the principles of the present invention; and FIGURE 2 is a partial vertical section taken on the line 2—2 of FIGURE 1 to an enlarged scale and with portions thereof broken away.

Referring to FIGURES 1 and 2 of the drawings, there is illustrated an apparatus which is especially designed for handling a meat mixture preliminary to processing operations, for example, stuffing the mixture into a sausage casing in which it is subsequently cooked or smoked.

In the form of the apparatus illustrated, a meat grinder 10 of well known construction is supported with the axis of its feed screw shaft 11 extending vertically and connected by a suitable drive chain or belt 12 with a motor 13. The meat is delivered through the feed line 14 to the grinder 10 usually in the form of a subdivided mixture and is forced through the grinder into the upper end of a cylindrical vacuum chamber forming member or receptacle 15, the latter being evacuated through the line 16 which is connected with a suitable vacuum pump (not shown). The grinder is provided with a grinder plate 17 having holes of a size to produce the desired fineness in the mixture and the feed to the grinder is necessarily maintained so that the grinder is substantially filled with meat and forms a seal for the upper end of the vacuum chamber 18 within the tank-like member 15. The ground meat mixture is discharged from the grinder 10 and falls in strings or relatively fine particles toward the lower or discharge end 20 of the chamber forming member 15, the latter being funnel-like in shape and terminating at its lower end at a discharge opening 21 which forms also an axial entrance to a vertically disposed "Moyno" type pump 22 attached to the bottom end of the chamber forming member 15.

The "Moyno" pump 22 is manufactured by Robbins & Meyers, Inc., Springfield, Ohio. It operates on a "progressing cavity" principle and is of well known construction. It comprises a cylindrical housing or stator 23, the interior of which is in the form of a double helical thread and a rotor 24 which is a true helical screw. The rotor is pivoted at 25 to the upper end of a connecting rod 26, the latter having its lower end pivoted at 27 to a drive shaft 28 suitably mounted in the lower end of the cylindrical pump body 30 with the latter having a side or laterally directed discharge opening 31 adapted for connection with a discharge conduit 32. The drive shaft 28 is, of course, mounted in the end of the pump body 30 so as to properly seal off the end of the body and insure the flow of material out of the body through the discharge opening 31. The drive shaft 28 is provided with a sprocket or pulley 33 which is connected to a suitable power source.

A helical screw formation 34 having a shaft or hub 35 is attached in axial alignment to the end of the rotor 24 at the top or entrance end of the pump 22 so that it rotates with the rotor 24. The shaft 35 carries a thread forming plate 36 arranged in downwardly spiraled relation on the shaft with the width of the plate decreasing in the direction of the pump entrance. The screw formation 34, when rotated with the pump rotor 24, forces the meat mixture, which falls by gravity toward the bottom of the vacuum chamber, into the pump 22 and insures that the pump cavity is filled during operation so as to form a seal for the bottom of the vacuum chamber and also serving to move the meat mixture through the pump with uniform flow and without permitting the entrance of any air into the mixture or the vacuum chamber.

The method of using the apparatus will be obvious from the description of the same. The meat is delivered usually in a coarse ground or subdivided mixture to the grinder 10 which reduces it to the desired particle size and delivers the same to the vacuum chamber 18 where it falls freely and is deaerated as it settles to the bottom. The deaerated mixture is accumulated in a mass in the bottom of the chamber and passes through the bottom opening 21 into the "Moyno" pump 22, assisted by the screw 34 which acts as a pusher. The pump 22 withdraws the mixture from the vacuum chamber in a continuously moving mass so as to provide a gas free mixture of uniform density. The process is, of course, designed primarily for continuous operation but it can be a batch operation.

In the form of the apparatus shown a "Moyno" pump is employed with the axis of the rotor extending vertically but a pump having a horizontally disposed rotor axis may be employed with equal effectiveness in carrying out the process.

While particular materials and specific details of construction have been described in connection with the illustrated form of the apparatus, it will be understood that other materials and equivalent structural details may be resorted to within the spirit of the invention.

I claim:

1. An apparatus for deaerating a ground meat mixture comprising a vacuum chamber having a top opening and a bottom opening, a meat grinder having a grinding plate mounted in the top opening and forming a closure therefor, means for feeding meat to the grinder for delivery through the grinding plate and into the top of the vacuum chamber, said meat mixture being deaerated as it drops by gravity to the bottom of the vacuum chamber, said vacuum chamber having a discharge opening at the bottom thereof and a discharge pump connected to the chamber so as to form a closure for said discharge opening, said pump being characterized by a cylindrical housing, the interior of which is in the form of a double helical thread and a rotor which is in the form of a helical screw for withdrawing the meat mixture from the vacuum chamber through the pump housing in a continuously moving mass so as to form a vacuum seal for the chamber opening and to deliver the meat from the vacuum chamber as a gas free mixture of uniform density 2. A meat grinding and deaerating apparatus comprising means forming a chamber having a top opening and a bottom opening, a meat grinder having a grinding plate and a feed screw mounted with its axis disposed vertically which grinder forms a closure for said top opening, means for evacuating the chamber so as to deaerate the ground meat as it falls in particle form toward the bottom of the chamber, and a pump connected to the bottom of the chamber forming means and providing a closure for the bottom opening which pump comprises a cylindrical stator, the interior of which is in the form of a double helical thread and a rotor which is in the form of a helical screw and which is operative to force the deaerated meat mixture through the stator and to feed it out of the vacuum chamber in a continuously moving mass.

3. A meat processing apparatus comprising means forming a chamber having openings at the top and bottom, means including a grinding plate for dividing the meat into particles, said dividing means forming a closure for the opening at the top of the chamber and delivering the meat particles through the grinding plate and into the chamber so that they will fall freely, means for evacuating the chamber so as to deaerate the meat particles as they fall toward the bottom of the chamber, a pump connected to the bottom of the chamber forming means and providing a closure for the bottom opening, said pump comprising a hollow body, the interior of which is in the form of a double helical thread and a rotor which is in the form of a helical screw for moving the meat particles in a continuous mass through the body, and an extension on the end of said rotor and within said chamber for forcing the meat particles toward the pump in the direction of the axis of the rotor, which rotor extension is in the form of a helical screw having a thread forming plate arranged in spiraled relation and decreasing in width in the direction of the pump entrance.

References Cited in the file of this patent

UNITED STATES PATENTS

| | | |
|---|---|---|
| 2,143,202 | Martinet | Jan. 10, 1939 |
| 2,617,460 | Levit | Nov. 11, 1952 |
| 2,681,279 | Sloan et al | June 15, 1954 |
| 2,934,115 | Grebe | Apr. 26, 1960 |
| 3,081,484 | Schnell | Mar. 19, 1963 |